US011701737B2

(12) United States Patent
Wang et al.

(10) Patent No.: US 11,701,737 B2
(45) Date of Patent: Jul. 18, 2023

(54) FRICTION-STIR-WELDED SHEET-AND-POST SIDEWALL

(71) Applicants: Qingdao CIMC Reefer Trailer Co., Ltd., Qingdao (CN); CIMC Vehicles (Group) Co., Ltd., Shenzhen (CN)

(72) Inventors: Xiaoyi Wang, Qingdao (CN); Niancheng Zhou, Qingdao (CN); Liming Song, Qingdao (CN)

(73) Assignees: Qingdao CIMC Reefer Trailer Co., Ltd., Qingdao (CN); CIMC Vehicles (Group) Co., Ltd., Qingdao (CN)

( * ) Notice: Subject to any disclaimer, the term of this patent is extended or adjusted under 35 U.S.C. 154(b) by 871 days.

(21) Appl. No.: 16/566,390

(22) Filed: Sep. 10, 2019

(65) Prior Publication Data

US 2021/0069823 A1    Mar. 11, 2021

(51) Int. Cl.
  B23K 20/12    (2006.01)
  B23K 103/10   (2006.01)
(52) U.S. Cl.
  CPC .......... *B23K 20/1265* (2013.01); *B23K 20/12* (2013.01); *B23K 20/122* (2013.01); *B23K 2103/10* (2018.08)
(58) Field of Classification Search
  CPC ...... B61D 17/043; B23K 20/12; B62D 33/04; E04B 2/72; E04B 2/721
  See application file for complete search history.

(56) References Cited

U.S. PATENT DOCUMENTS

| 3,115,572 A | * | 12/1963 | Taschinger | ........... B23K 9/0043 219/127 |
| 3,334,007 A | * | 8/1967 | Flagan | ................... B65D 90/08 52/716.5 |
| 3,393,920 A | * | 7/1968 | Ehrlich | ................ B62D 33/048 280/789 |
| 3,815,517 A | | 6/1974 | Przyblinski | |
| 3,842,755 A | * | 10/1974 | Carr | ...................... B60P 7/0815 410/113 |

(Continued)

OTHER PUBLICATIONS

Surendrababu: Material Flow Behaviour in Friction Stir Welding Process—A Critical Review on Process Parameters and Modeling Methodologies, Jun. 2013, 7 pages.

(Continued)

*Primary Examiner* — Adam Krupicka
(74) *Attorney, Agent, or Firm* — Niro McAndrews LLP

(57) ABSTRACT

The disclosed wall includes several narrow aluminum sheets and posts that are Friction Stir Welded (FSW) into a sidewall. The length of the wall is the summation of the narrow sheets' width, and the walls width is the narrow sheets' length. Several aluminum posts are spaced along the wall's length direction in order to improve the stiffness and strength of the wall. When welding the aluminum sheets and posts together, the sheets are placed under the posts and jointed tightly together through FSW. With the high-speed spinning of the stirring pin, the post and sheet melt and form into a compact solid phase weld seam under the extrusion of the welding head. When welding two aluminum sheets and one post together, the two sheets are placed edge-to-edge or slightly overlapped. The post is then placed over the sheet joint and the stir-welding head melts portions of the post and the two sheets simultaneously.

8 Claims, 14 Drawing Sheets

(56) References Cited

U.S. PATENT DOCUMENTS

| | | | |
|---|---|---|---|
| 4,065,168 A * | 12/1977 | Gregg | B62D 33/04 |
| | | | 296/29 |
| 5,433,501 A * | 7/1995 | Thomas | B61D 17/08 |
| | | | 296/191 |
| 6,106,205 A | 8/2000 | Haire | |
| 6,179,369 B1 | 1/2001 | Bender | |
| 6,505,883 B1 | 1/2003 | Ehrlich | |
| 6,607,237 B1 | 8/2003 | Graaff | |
| 6,652,018 B2 | 11/2003 | Buchholz | |
| 6,662,424 B2 | 12/2003 | Ehrlich | |
| 6,733,900 B2 | 5/2004 | Satou | |
| 6,779,707 B2 * | 8/2004 | Dracup | B23K 20/1265 |
| | | | 244/119 |
| 6,933,057 B2 | 8/2005 | Young | |
| 6,959,959 B1 | 11/2005 | Roush | |
| 7,011,358 B2 | 3/2006 | Graaff | |
| 7,178,303 B2 | 2/2007 | Aota | |
| 7,234,626 B2 | 6/2007 | Trapp | |
| 7,258,391 B2 | 8/2007 | Graaff | |
| 7,422,270 B2 | 9/2008 | Graaff | |
| 7,461,888 B2 | 12/2008 | Brown | |
| 7,503,368 B2 | 3/2009 | Chapman | |
| 7,527,325 B2 | 5/2009 | Yurgevich | |
| 7,530,486 B2 | 5/2009 | Flak | |
| 7,621,589 B1 | 11/2009 | Gerome | |
| 7,798,753 B2 | 9/2010 | Yurgevich | |
| 7,926,866 B2 | 4/2011 | Schmidt | |
| 8,016,152 B2 | 9/2011 | Roush | |
| 8,282,148 B2 | 10/2012 | Kloepfer | |
| 8,540,099 B2 | 9/2013 | Roush | |
| 8,579,180 B2 | 11/2013 | Burford | |
| 9,999,940 B2 * | 6/2018 | Mialhe | B23K 20/122 |
| 10,059,512 B2 | 8/2018 | Adams | |
| 10,183,702 B2 | 1/2019 | Jaworski | |
| 2003/0071486 A1 | 4/2003 | Graaff | |
| 2004/0065040 A1 | 4/2004 | Aota | |
| 2006/0049234 A1 | 3/2006 | Flak | |
| 2006/0158005 A1 | 7/2006 | Brown | |
| 2006/0181112 A1 | 8/2006 | Ehrlich | |
| 2006/0237993 A1 | 10/2006 | Wiebe | |
| 2007/0039284 A1 | 2/2007 | Munoz Royo | |
| 2008/0237305 A1 | 10/2008 | Rennick | |
| 2009/0200423 A1 * | 8/2009 | Tucker | B64C 3/26 |
| | | | 244/123.1 |

OTHER PUBLICATIONS

Colligan: Material Flow Behavior during Friction Stir Welding of Aluminum, Jul. 1999, 9 pages.

Colligan: Stirred, Not Shaken: An Introduction to Friction Stir Welding, Jul. 2005, 3 pages.

Khaled: An outsider looks at friction stir welding, Jul. 2005, 71 pages.

Hoffman: Compression Buckling Behavior of Large Scale Friction Stir Welded and Riveted 2090-T83 Al-Li Alloy Skin-Stiffener Panels, Aug. 2002, 44 pages.

* cited by examiner

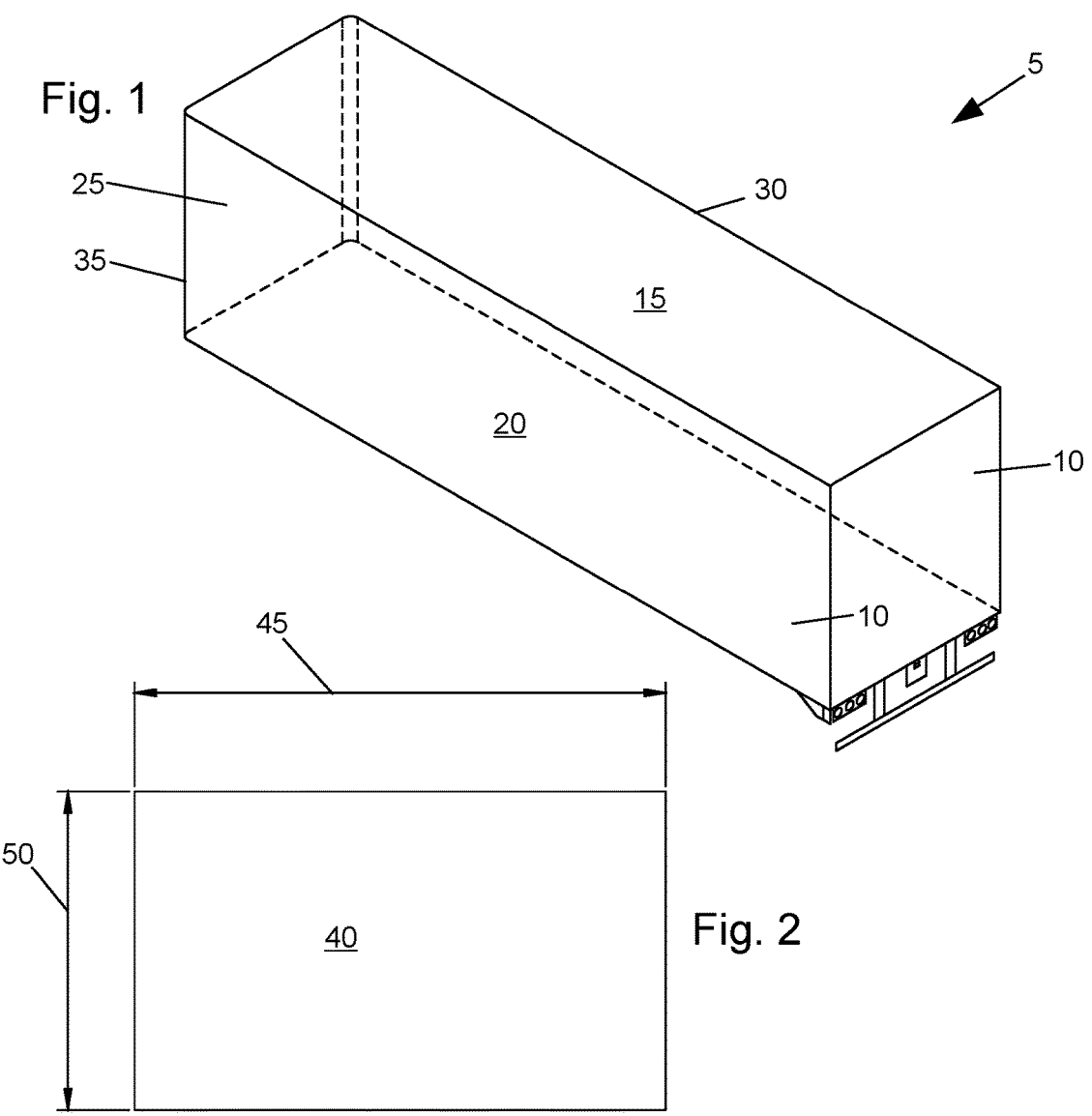
Fig. 1
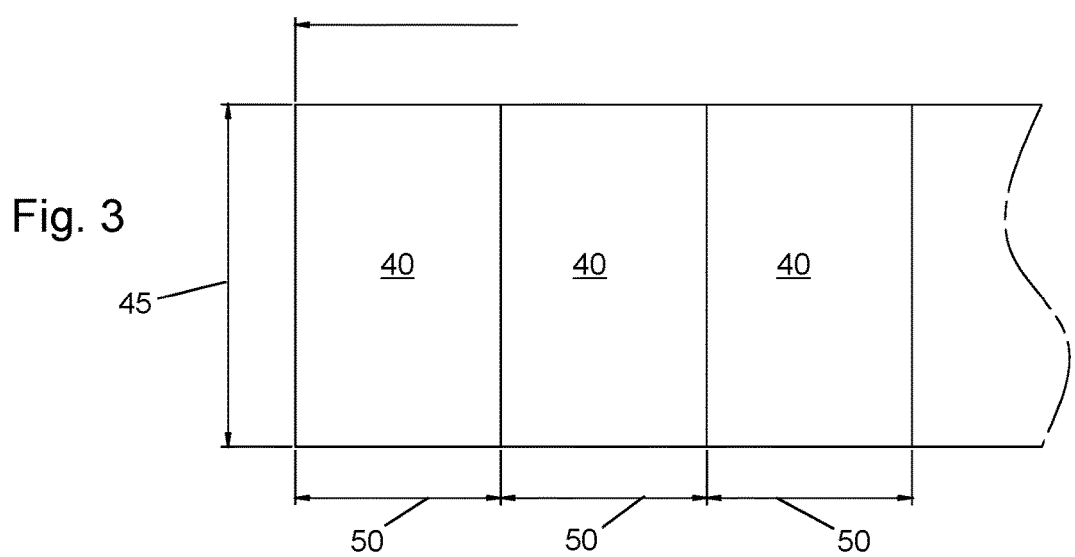
Fig. 2
Fig. 3

Fig. 6
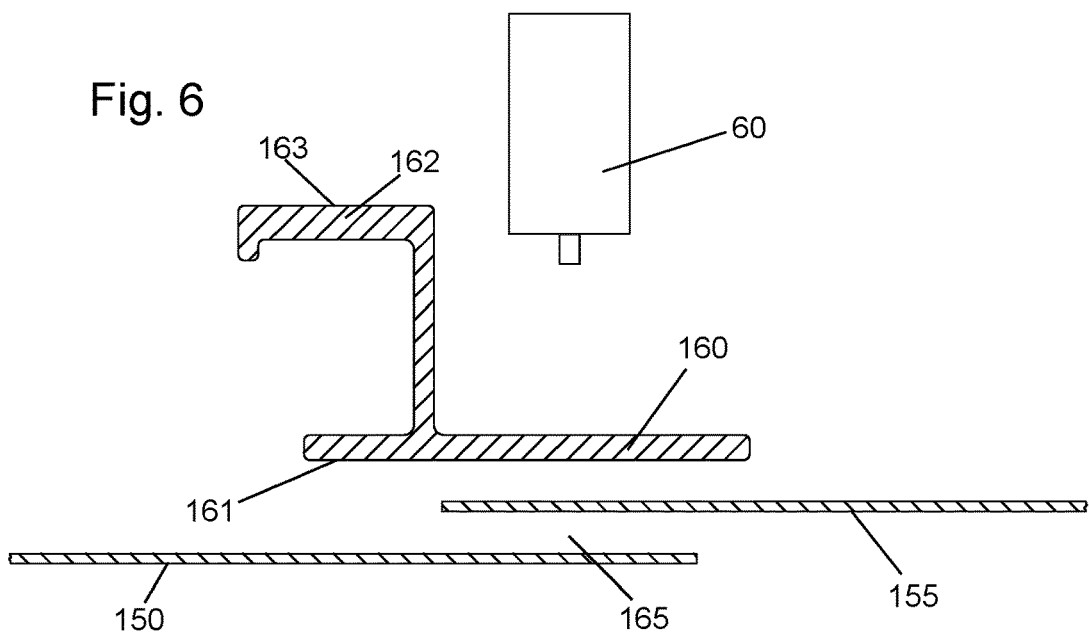
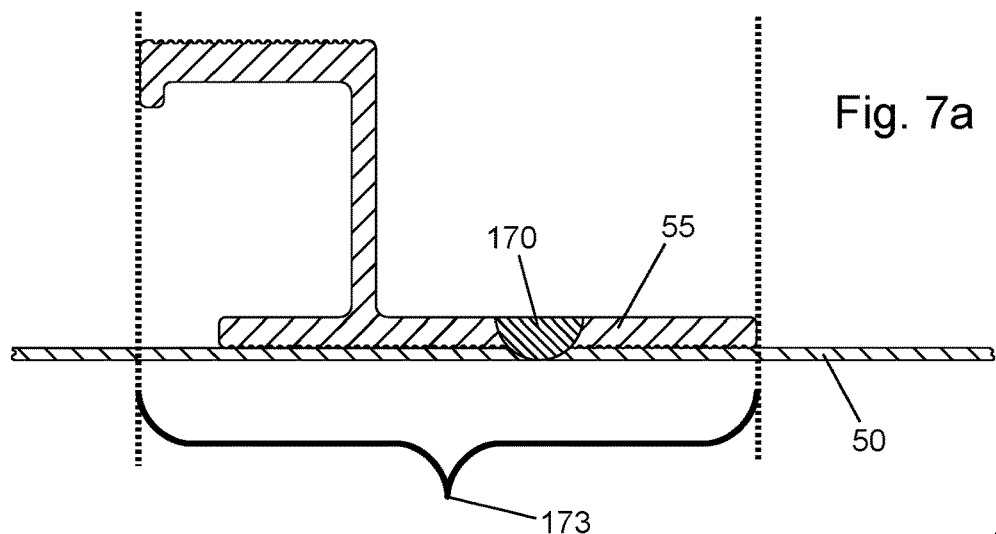
Fig. 7a
Fig. 7b
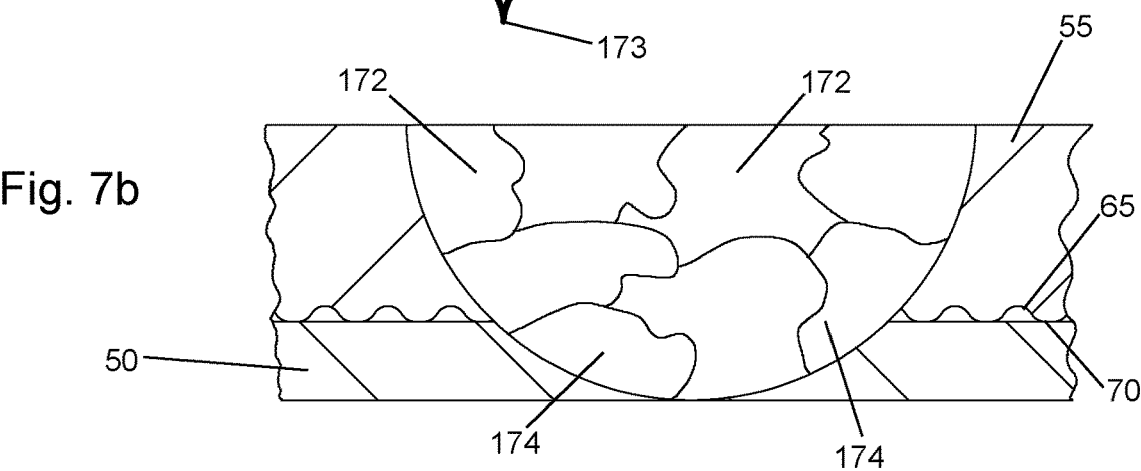

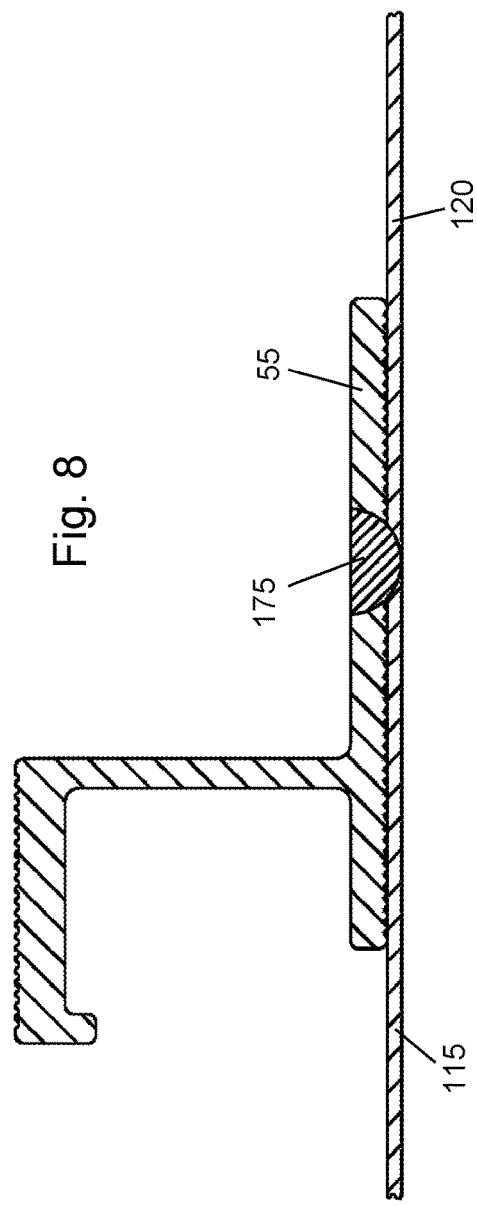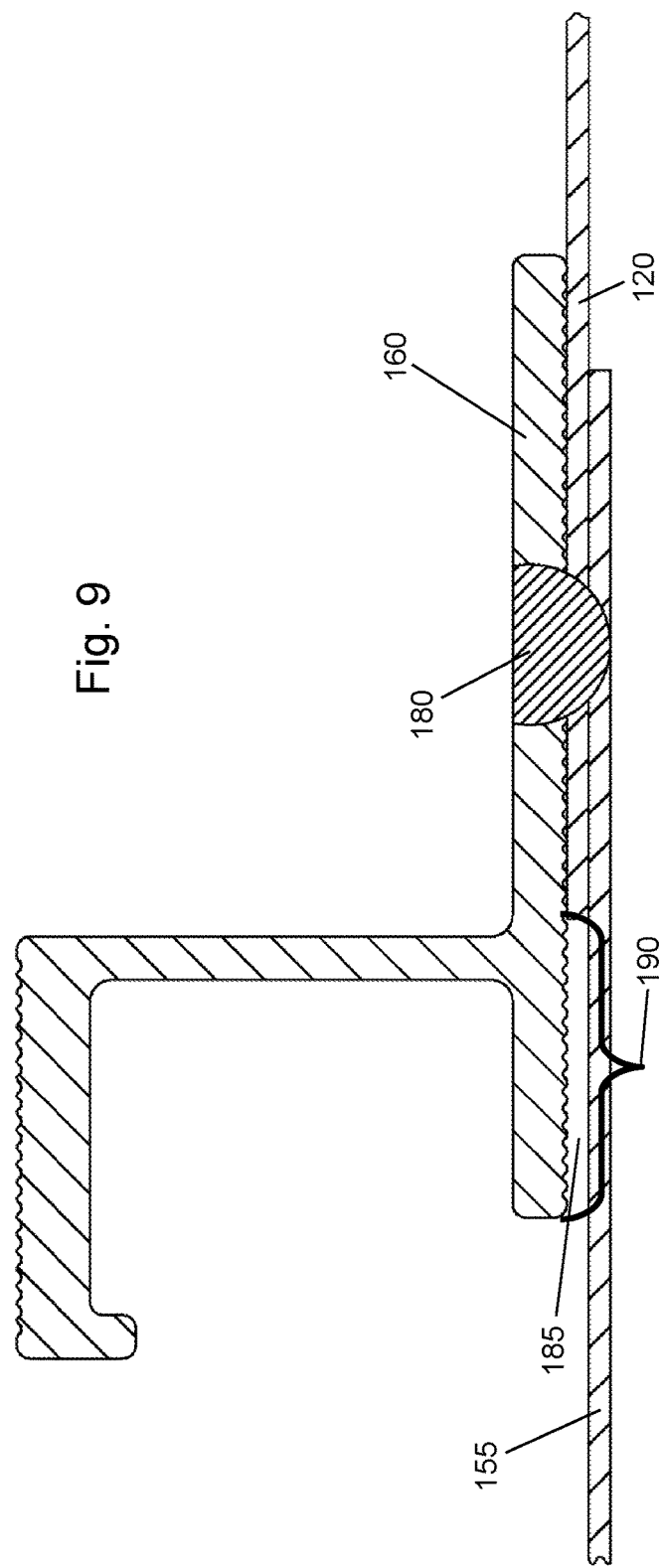

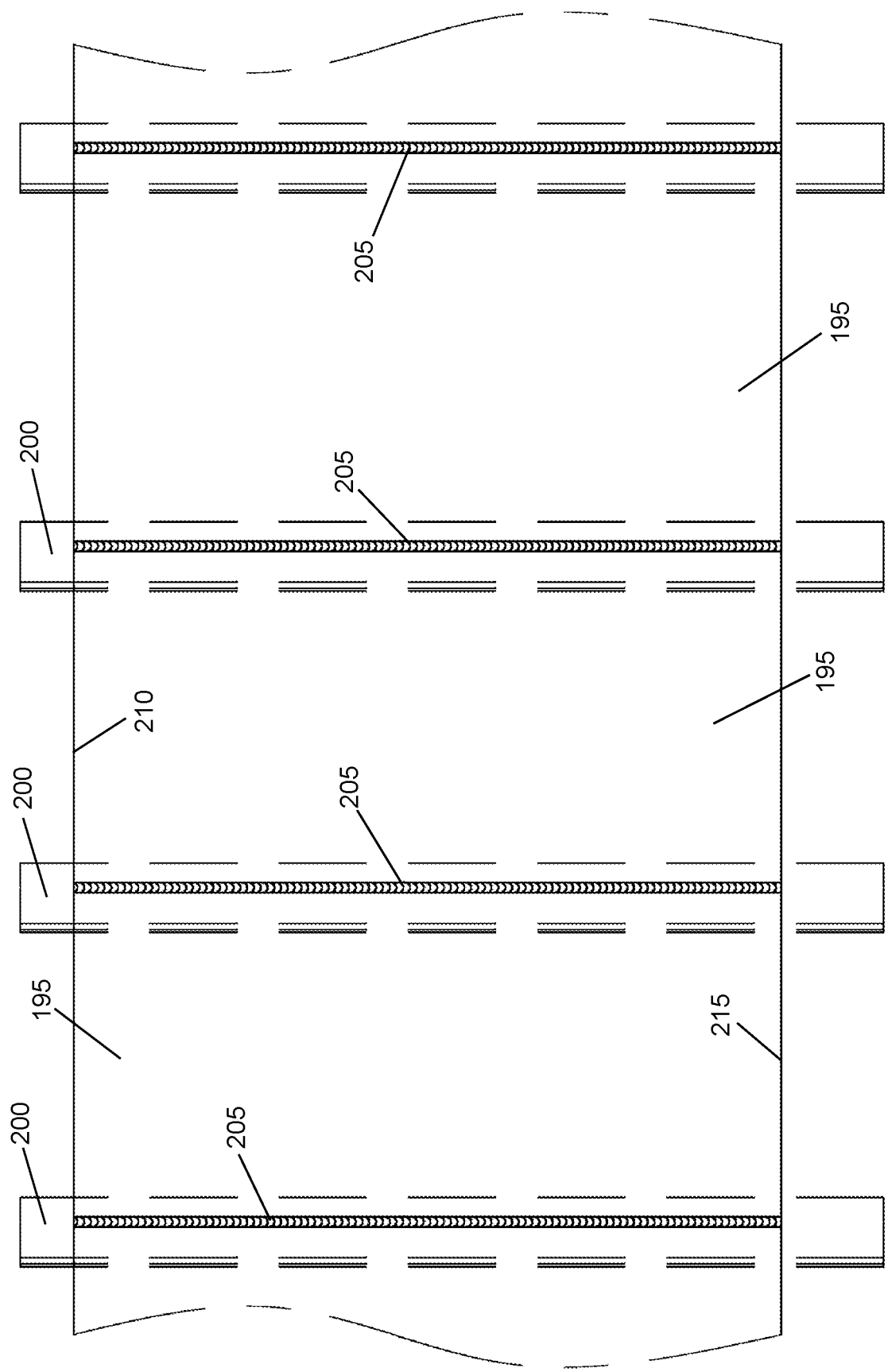

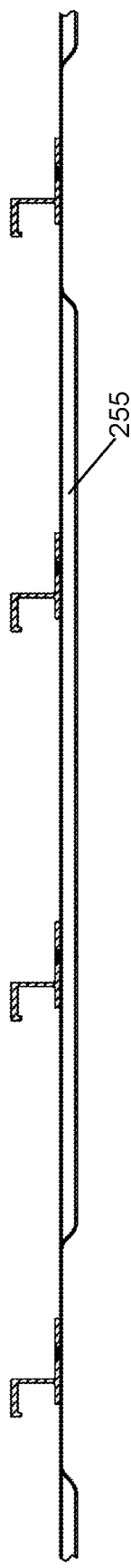

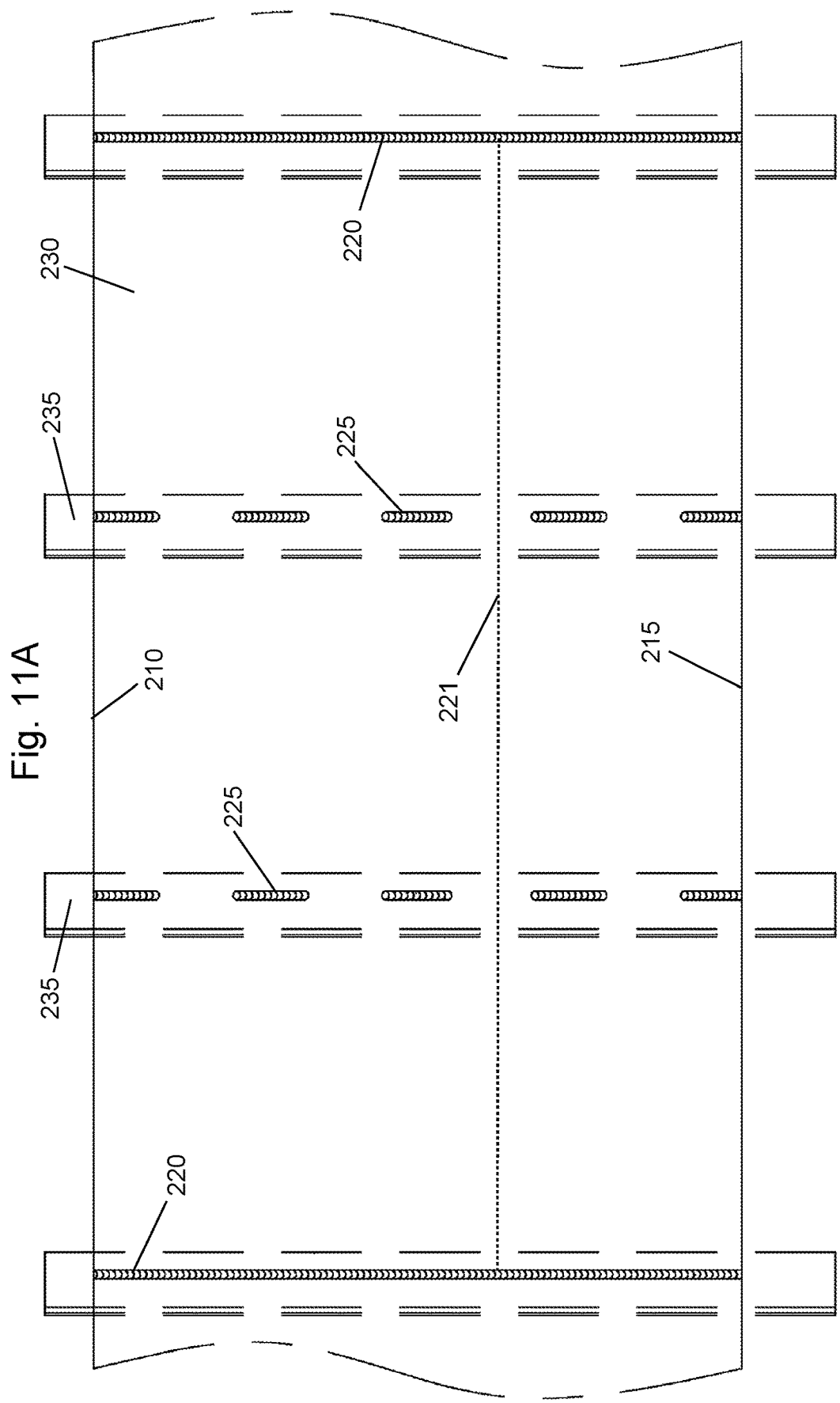

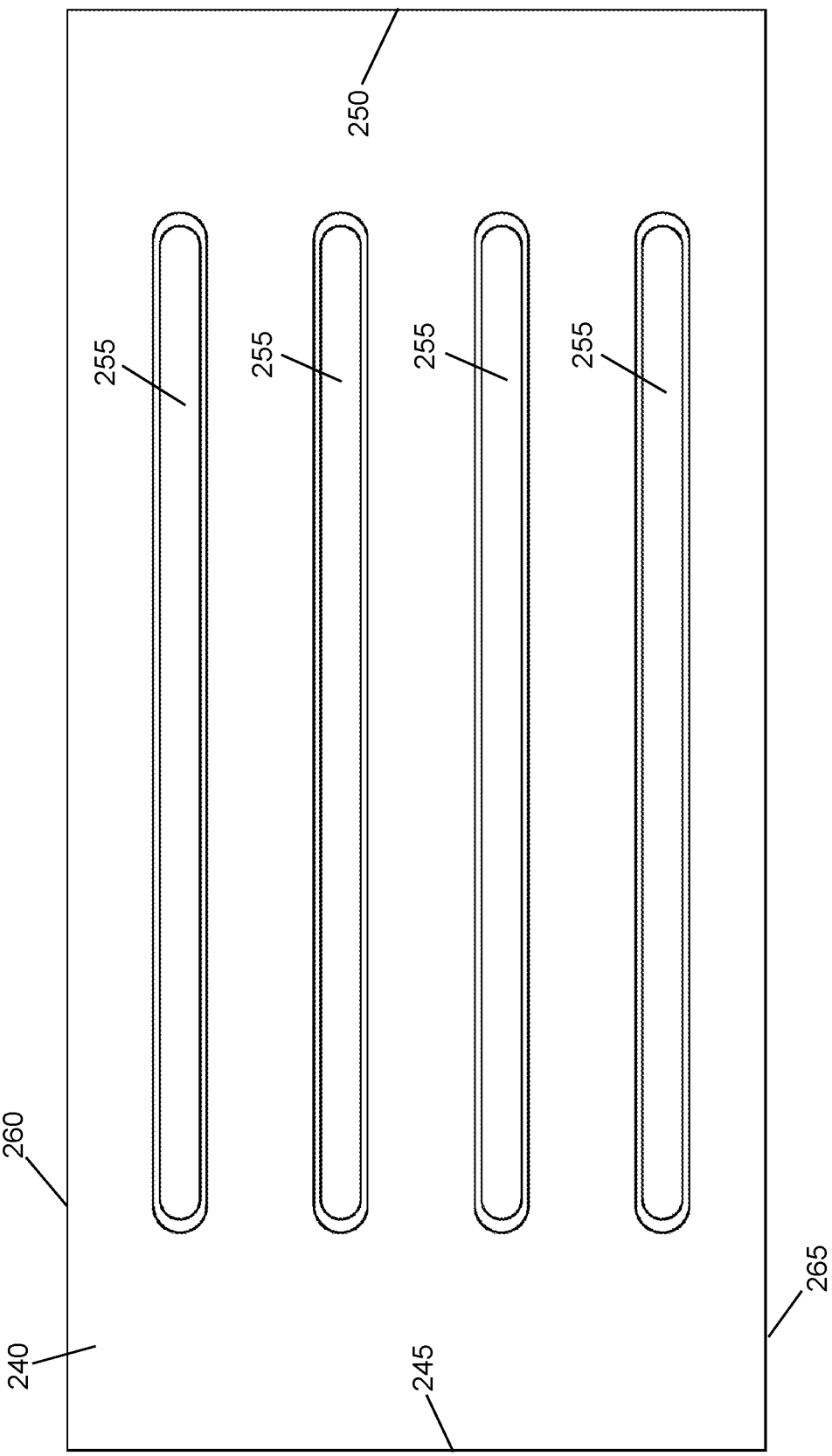

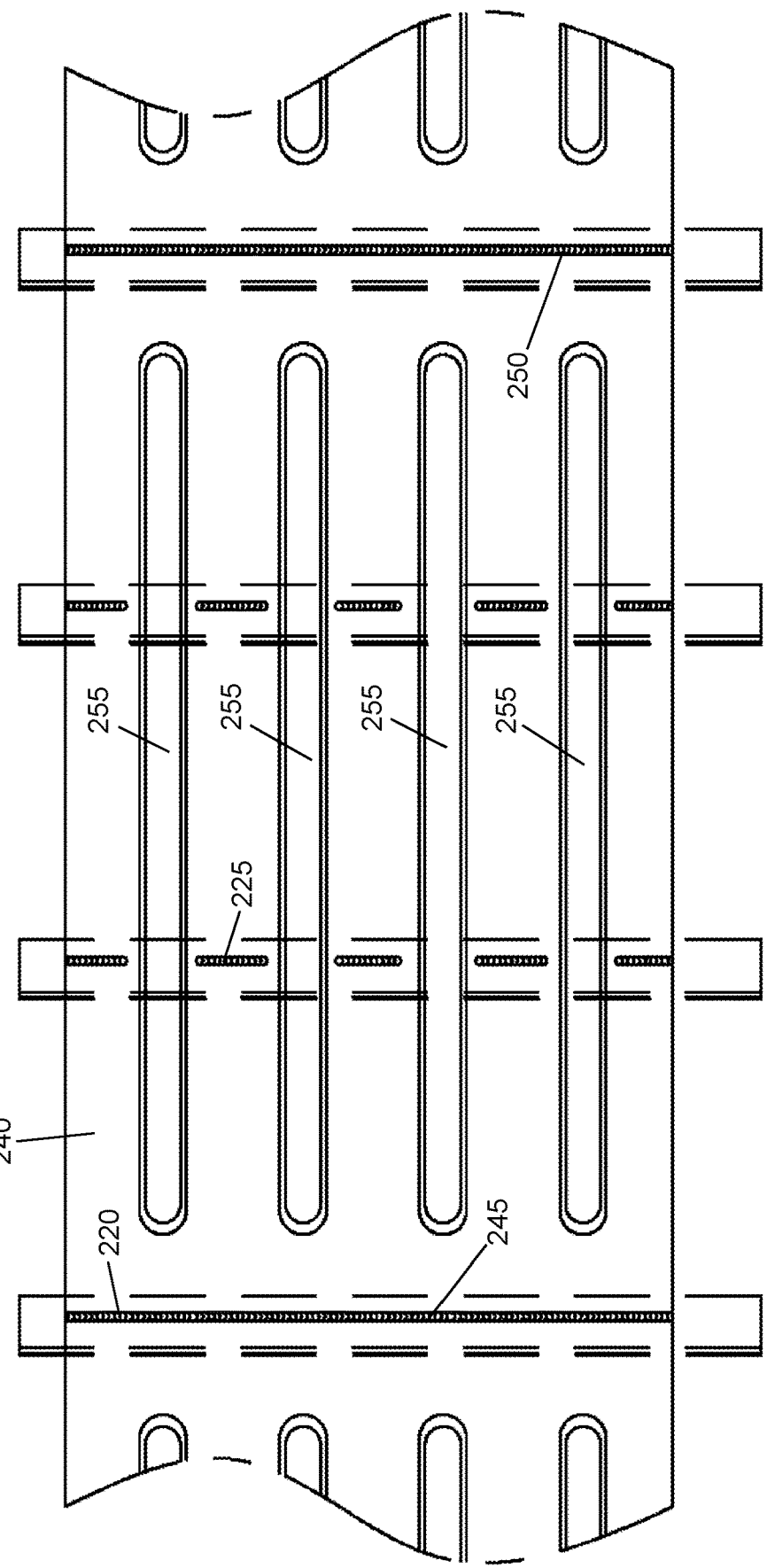

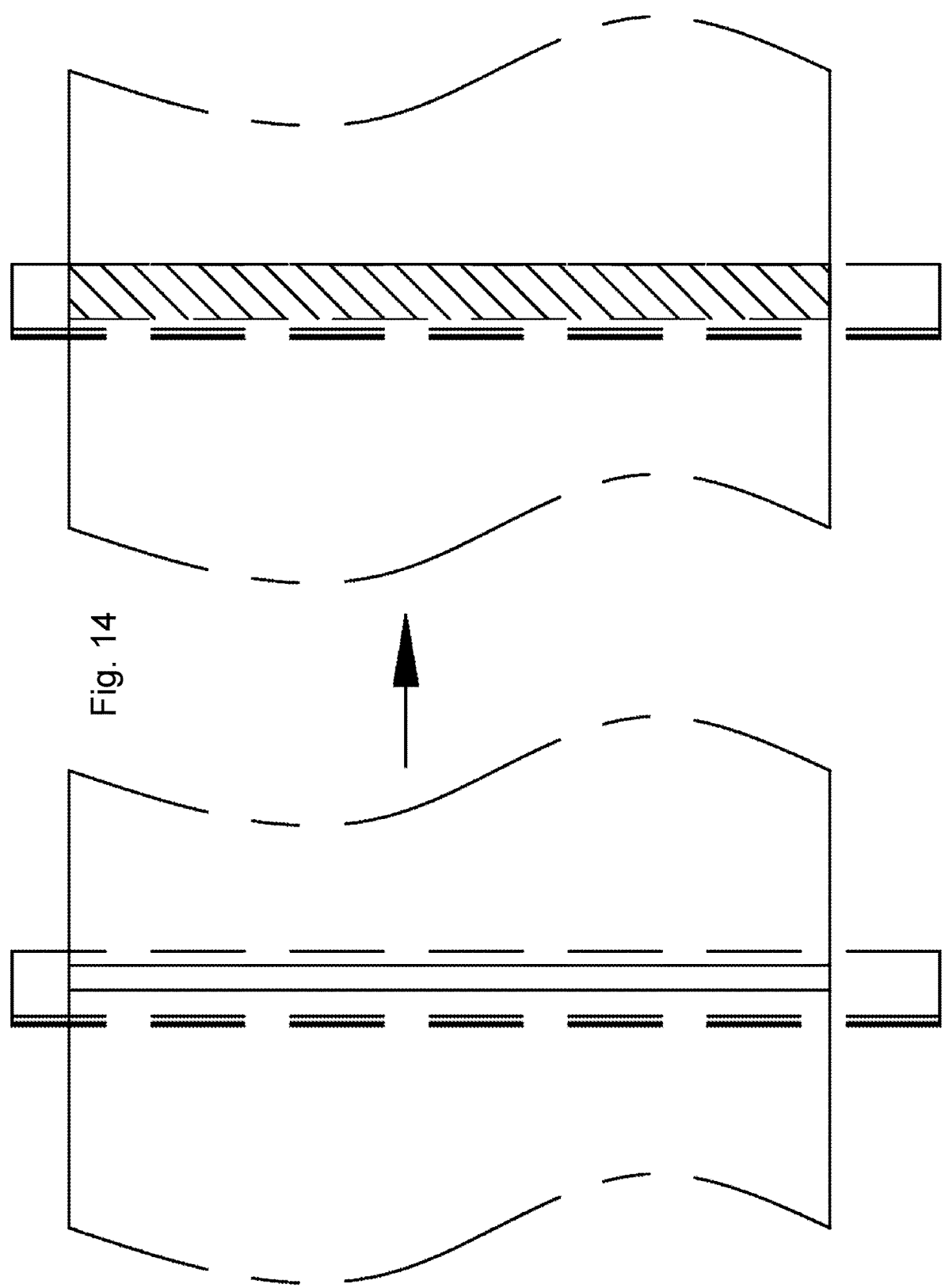

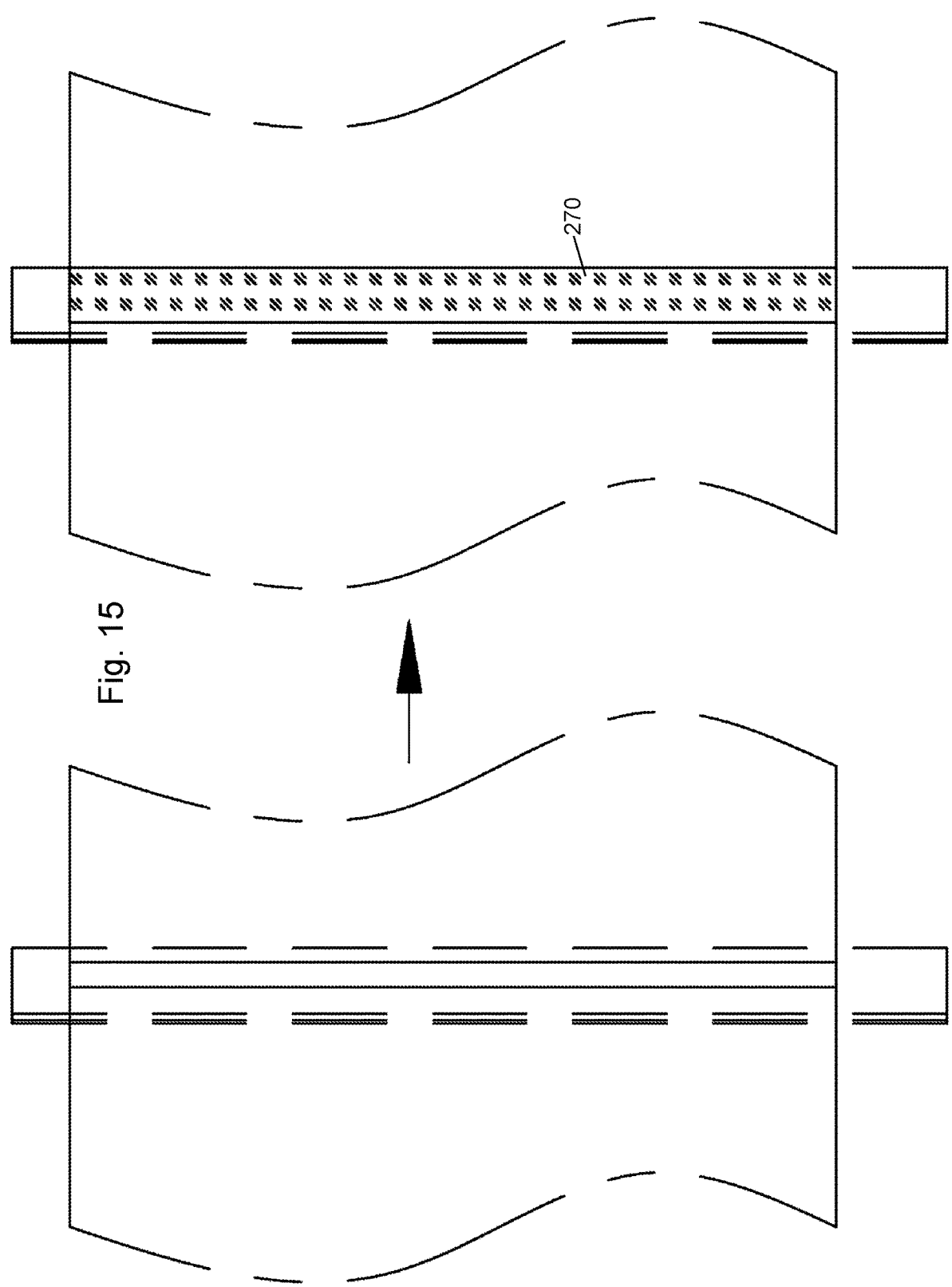

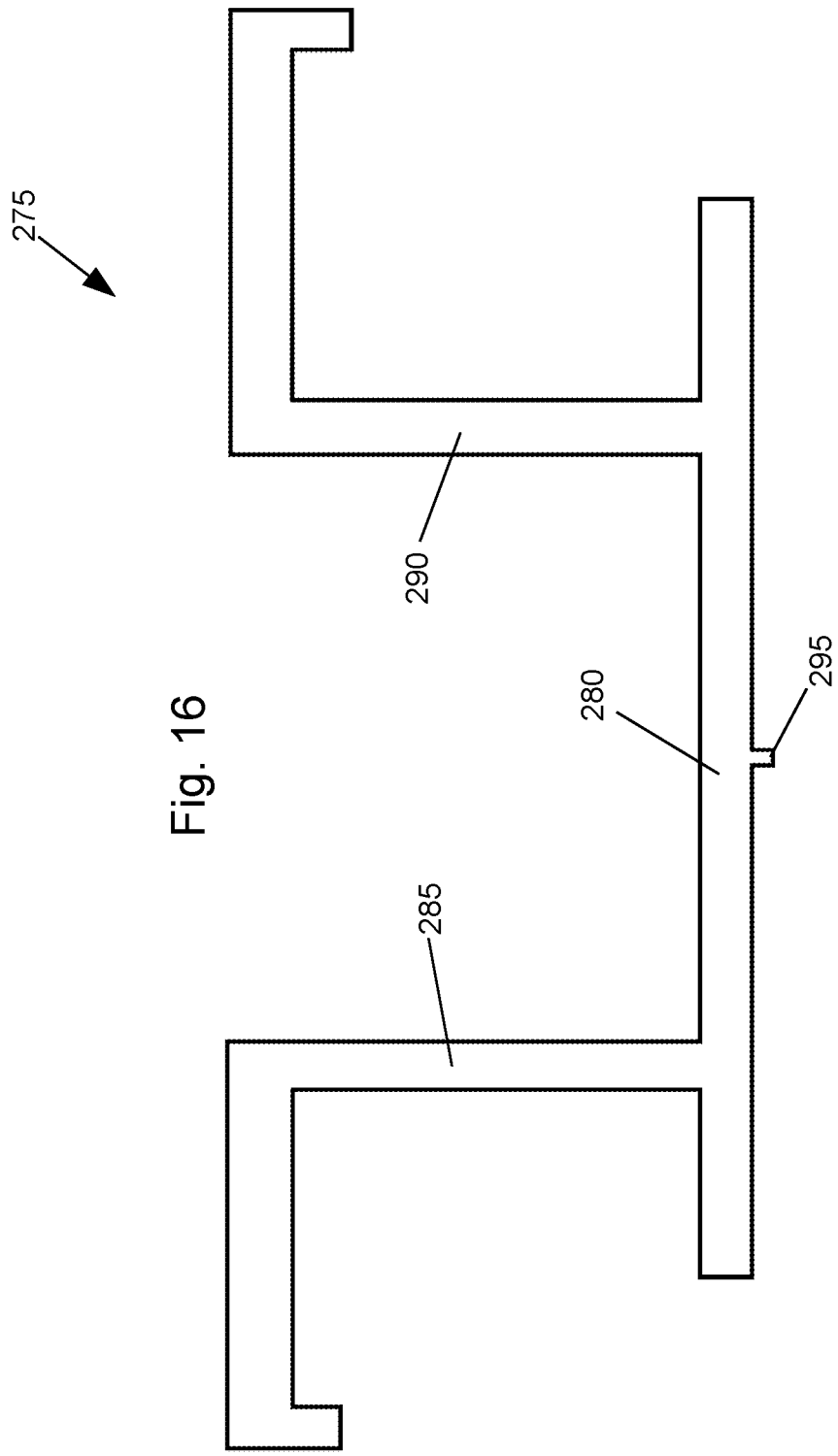

FRICTION-STIR-WELDED SHEET-AND-POST SIDEWALL

FIELD OF THE INVENTION

The present invention relates generally to a sidewall construction for a cargo container, and more particularly to a thin structural sheet and post connector sidewall construction. The present invention is especially adapted for the use in the construction of side wall outer panels, side wall inner linings, roof outer panels, roof inner linings, nose outer panels, and nose inner linings (collectively "walls") that are connected with aluminum alloy sheets and posts.

BACKGROUND OF THE INVENTION

Designers of cargo containers have long faced many related challenges in the design of container sidewalls. First, the structural integrity of the overall container depends on the rigidity and strength of the sidewalls. Second, the sidewalls are optimally light in weight to reduce the transportation costs for the overall container. Third, government regulations, or industry standards, often limit the exterior dimensions of cargo containers. Thus, to maximize the capacity of the container, designers seek to minimize the width of the sidewalls without compromising the structural integrity of the container. Fourth, because cargo containers are repeatedly loaded and unloaded, the interior walls of the container must be resistant to the repeated impact of vehicles and implements used to load and unload the container. Containers must optimally be free of protrusions and snag points that could impede loading and unloading. Fifth, means for securing and dividing cargo within a container are often desirable, and may be provided by incorporating logistics slots in the sidewalls of the container. Sixth, even resilient sidewalls may become damaged with extended use and require replacement or repair. Seventh, installing bolts or rivets commonly used in assembling sidewalls increases the container construction time, sidewall thickness, and the cost of the container. Eighth, various thicknesses of panels are used in container construction based on the desired characteristics of the container. Connectors between panels must be adaptable to these various thicknesses. Other considerations, including the cost and availability of the sidewall components and the ease of manufacturing, are also important.

These challenges are particularly acute in the design and construction of sidewalls for over-the-road trailers. Structural integrity for trailers is, of course, essential to the safe transportation of goods and materials on public highways. This structural integrity has conventionally been provided by either a "sheet-and-post" or a structural panel sidewall construction.

Aluminum alloy sheet-and-post walls have narrow aluminum sheets (often with widths less than 2440 mm) and aluminum alloy posts. These panels in sheet-and-post walls will commonly be over 3000 mm in length and over 2500 mm in width when completed. The narrow aluminum sheet is used widely in production due to its general availability and lower costs than wider aluminum sheets. Sheet-and-post walls are typically constructed by riveting or bonding together the sheets or posts. Welding methods, such as TIG or MIG, are not commonly used because they generally result in the construction having a lower strength in welding seam, more defects such as air hole, more deformation, and more risk of air and water leakage.

Riveting and bonding together the sheet-and-post walls also introduces several problems. In riveted constructions, riveting holes need to be punched into the sheets and posts, the rivets must be properly placed/aligned in the holes, and if the wall is of a foamed refrigerated container, the edge joint will need to be taped before riveting in order to prevent the foam leakage. This process requires much work and many hours of labor. Additionally, the use of rivets results in rivet heads on the exterior side of the wall such that the exterior side is rough and un-aerodynamic, and that decals are difficult to apply to the wall. The use of rivets also creates the potential for water leakage through the rivet holes. In insulated containers, the rivets and their holes also provide a potential means for air to flow in and out of the container.

Bonding together the sheets and posts also introduces significant challenges as this process requires a high level of process quality, working conditions and workers' technical expertise. Defects when bonding the sheets and posts together will have a significant impact on the wall strength and cause water and air leakages. Additionally, the use bonding agents significantly slows down production times as the sheets and posts must be pressed together for an extended period of time as the adhesives cure.

Accordingly, an object of the present invention is to provide a wall construction for a container that is lightweight, rigid, strong, watertight, and significantly airtight.

Finally, an object of the present invention is to provide a cargo container sidewall configuration that is economical to manufacture and refined in appearance.

SUMMARY OF THE INVENTION

An improved sheet-and-post wall construction is presented. While maintaining the benefits of standard sheet-and-post designs, the wall construction also achieves many additional benefits including ease of production, short production cycles, and improved air and water sealing. The disclosed wall construction can be used in lieu of traditional riveting or adhesive bonding methods in sidewalls.

The wall includes several narrow aluminum sheets and post that are Friction Stir Welded (FSW) into a single panel. The length of the wall is the summation of the narrow sheets' width, and the wall's width (or height) is the narrow sheets' length. Several aluminum posts are spaced along the wall's length direction in order to improve the stiffness and strength of the wall. When welding the aluminum sheets and posts together, the sheets are placed under the posts and jointed tightly together through FSW. With the high-speed spinning of the stirring pin, the post and sheet melt and form into a compact solid phase weld seam under the extrusion of the welding head. When welding two sheets and a post together, the two sheets are placed edge-to-edge or slightly overlapped. The post is then placed over the sheet joint and the stir-welding head melts portions of the post and the two sheets simultaneously. With the high-speed spinning of the stirring pin, the post and sheet melt in the edge joint area and form into compact solid phase weld seam under the extrusion of the welding head.

The walls produced by the FSW technology have less deformation, better flatness, higher strength and fewer defects in the weld seam area. There is no risk of water leakage. The wall has better overall performance and requires less labor and fewer work hours to construct. These and other advantages will become apparent as this specification is read in conjunction with the accompanying drawings and claims.

BRIEF DESCRIPTION OF THE DRAWINGS

FIG. 1 is a perspective view of the body construction of a trailer.

FIG. 2 is an isolated view of a narrow aluminum sheet.

FIG. 3 is an elevational view of a wall formed from several narrow aluminum sheets.

FIG. 6 is an elevational view of two sheets, a post, and an FSW stir head for joining the sheet and post together in an overlapped manner.

FIG. 7a is an elevational view of a sheet and post secured together with an FSW weld.

FIG. 7b is a zoomed in view of FIG. 7a.

FIG. 8 is an elevational view of two sheets and post secured together with an FSW weld joining the sheets and post together with a flat outer side.

FIG. 9 is an elevational view of two sheets and post secured together with an FSW weld joining the sheets and post together in an overlapped manner.

FIG. 10A is an elevational view of a first wall construction comprised of several aluminum sheets and posts secured together with FSW welds.

FIG. 10B is a plan view of a first wall construction comprised of several aluminum sheets and posts secured together with FSW welds.

FIG. 11A is an elevational view of a second wall construction comprised of several aluminum sheets and posts secured together with FSW welds.

FIG. 11B is a plan view of a second wall construction comprised of several aluminum sheets and posts secured together with intermittent FSW welds.

FIG. 12 is an elevational view of an aluminum sheet with closed end corrugations.

FIG. 13A is an elevational view of a wall construction made from several corrugated aluminum sheets and posts secured together with FSW technology.

FIG. 13B is a plan view of a wall construction made from several corrugated aluminum sheets and posts secured together with FSW technology.

FIG. 14 is an illustration of a spray paint repair of paint damage after FSW.

FIG. 15 is an illustration of an adhesive tape repair for paint damage after FSW.

FIG. 16 is a cross-sectional view of a post having dual flanges and ribs.

DETAILED DESCRIPTION

Figure 4:
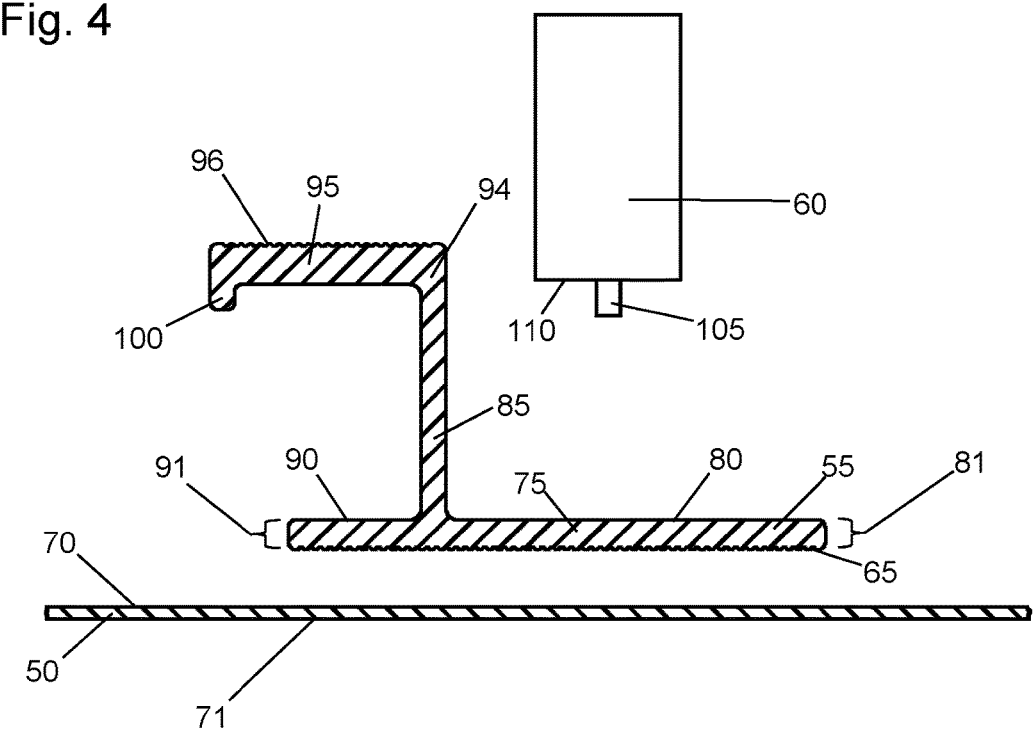
FIG. 4 is an elevational view of a view of a sheet, a post, and an FSW stir head for securing the post to the sheet.

The disclosed wall construction may be used with any type of cargo container and is particularly suited for applications requiring a large, lightweight container that is regularly loaded and unloaded by utility vehicles. The improved wall construction may be used with containers transported by road, rail, sea, or air. However, for descriptive purposes, the sidewall construction will be described in use with an over-the-road trailer.

FIG. 1 shows a side perspective view of a trailer 5 with sidewalls 10, a roof 15, a floor 20, and a front wall 25. The roof 15, sidewalls 10, and floor 20 have a common length 30 while the sidewalls 10 and front wall 25 have a common height 30 (or width). The term "wall" is herein defined to include more than vertically oriented structures. For example, a "floor" or a "ceiling" may be a "wall." In an embodiment of an over-the-road trailer, the length 30 of the trailer is greater than six meters while the width 35 (or height) of the trailer is greater than 2.5 meters. In an exemplary embodiment, a trailer 5 has a length 30 of 53 feet (16.15 meters), and a height of 110 inches (2.79 meters). In the exemplary embodiment, the length to height (or width) ratio of the trailer is approximately 5.75-to-1, however in the example of a shipping container the length to height ratios of the side wall may be 4.7-to-1 for a standard 40 foot container, 3.3-to-1 for a 20 foot container, or 4.22-to-1 and 2.09-to-1 for the extra tall variants of the 40 and 20 foot containers, respectively.

The size of the trailer 5 introduces challenges for aluminum construction as the industry standard aluminum coil is less than 2.44 meters (8 feet) thus requiring numerous individual pieces (with up to 8-foot widths) combined together to form a continuous wall. FIG. 2 shows an example of an aluminum sheet 40 having a 2.79-meter length 45 and a 2.44-meter width 50. FIG. 3 shows an example of multiple aluminum sheets 40 secured together about their lengths 45 to form a sidewall with a length approximately equal to the sum of the multiple widths 50 of the aluminum sheets.

FIG. 4 shows an example of a sheet 50 and post 55 positioned to be secured together by an FSW tool 60. In the illustrated example, the sheet 50 is composed of a first material, such as aluminum, while the post 55 is comprised of a second material, such as aluminum or 5005 aluminum alloy (99.2% Al, 0.8% Mg). The sheet 50 and post 55 may be composed of the same material, or different materials. The sheets and posts may be constructed of other materials such as 1100 aluminum alloy (99.9% Al, 0.1% Cu), 2014 aluminum alloy (93.5% Al, 4.4% Cu, 0.8% Si, 0.8% Mn, 0.5% Mg), 2024 aluminum alloy (93.5% Al, 4.4% Cu, 0.6% Mn, 1.5% Mg), 3003 aluminum alloy (98.6% Al, 1.2% Mn, 0.12% Cu), 3004 aluminum alloy (97.8% Al, 1.2% Mn, 1% Mg), 5005 aluminum alloy (99.2% Al, 0.8% Mg), or 6063 aluminum alloy (98.9% Al, 0.4% Si, 0.7% Mg). In an exemplary embodiment of the invention, the sheet 50 is made from 3003 aluminum alloy (98.6% Al, 1.2% Mn, 0.12% Cu) or 5052 aluminum alloy (97.2% Al, 2.5% Mg, 0.12% Cr) while the post 55 is constructed of 6061 aluminum alloy (97.9% Al, 0.6% Si, 1.0% Mg, 0.25% Cu, 0.2% Cr). The term "aluminum alloy" is herein defined to mean a material that is at least 80% aluminum.

In the illustrated example, the sheet 50 is continuous at the location the post is to be attached. In this example, the post 55 may be added to the sheet in order to increase the overall strength of the resulting wall, or the post 55 may be added at a specific location to provide a location for a logistics slot. For example, the post 55 may include a slot into which tie-downs may be inserted so that cargo within the container is prevented from shifting in transit. In the illustrated example, the post 55 has an outer surface 65 adapted to contact the inner surface 70 (or side) of the sheet 50. The outer surface 71 (or side) of the sheet 50 is flat and parallel to the inner surface 70.

While both the outer surface 65 and the inner surface 70 may both be smooth or planar, in the illustrated example the outer surface 65 includes a slight texture. In the welding process, the sheet 50 and post 55 are pressed together tightly and the textured outer surface 65 of the post 55 may assist in preventing the sheet 50 and post 55 from accidentally moving relative to each other during the welding process. In addition to the textured surfaces, jigs may be utilized to prevent the sheets and posts from moving relative to each other during the welding process. The textured outer surface 65 of the post 55 is located on a base 75 that is significantly planar in the illustrated cross-section example. The first inner surface 80 of the base 75 is opposite to and significantly parallel to the overall orientation of the textured outer surface 65. While different sizes of bases may be utilized depending on the application, in the illustrated example, the base has a width (between the first inner surface 80 and the outer surface 65) that is approximately 15% the length of the outer surface 65.

FIG. 4 shows a cross section of the post 55, and the heights of the respective features are all approximately the height of the sidewall. Extending inward from the base 75 adjacent to the first inner surface 80 is a flange 85. The flange 85 extends perpendicular to the first inner surface 80 from directly adjacent the first inner surface 80. In the illustrated example, the flange 85 has an inward length that is approximately 70% the lateral width of the first inner surface 80. The inward length of the flange 85 may be increased or decreased based on the desired characteristics of the container. For example, to increase the structural strength of the sidewall, the inward length of the flange may be increased to greater than 100% the lateral width of the first inner surface 80. Alternatively, to increase the useable storage space within a container, the length of the flange 85 may be decreased to below 50% the lateral width of the first inner surface 80.

The base 75 includes a second inner surface 90 that is separated by the first inner surface 80 by the flange 85. The first and second inner surfaces (80, 90) are coplanar, and in the illustrated example the second inner surface 90 has a width that is only approximately 30% the width of the first inner surface 80. While other size proportions of the first and second inner surfaces (80, 90) are contemplated—such as the second inner surface 90 having a width between 20% and 75% the width of the first inner surface—it is generally expected that the first inner surface 80 will be larger than the second inner surface 90 to accommodate the FSW tool 60 interacting with, and welding, the first inner surface 80. In another embodiment, the surface area of the first inner surface 80 is at least twice the size of the surface area of the second inner surface 90.

The first inner surface 80 is separated from the outer surface 65 by a first distance 81 while the second inner surface 90 is separated from the outer surface 65 by a second distance 91. In the illustrated example, the first and second distances (81, 91) are equal, however in other embodiments the two distances will be unequal.

Laterally extending from the inner-most end 94 of the flange 85 is a rib 95 that laterally extends away from the first inner surface 80. While not extending co-planar with the first and second inner surfaces (80, 90) the rib 95 in the illustrated example is oriented parallel to the first and second inner surfaces (80, 90). The rib 95 has an interior surface 96 that extends away from, and parallel to, the first inner surface 80 of the post 55. Extending outwardly from the outer end of the rib 95 is a hook 100 that generally extends towards the second inner surface 90 of the base 75. The rib 95 and 100 may be used to secure panels or liners (not shown) between posts. An example of a panel or liner is element 6 of U.S. Pat. No. 7,422,270 issued to Graaff. The disclosure of U.S. Pat. No. 7,422,270 regarding panels or liners, including their shapes and compositions, is herein incorporated by reference.

The FSW tool 60 includes a probe 105 (sometimes called a pin) adapted to be plunged into the base 75 of the post 55 and the sheet 50. In FSW technology, the probe is constructed of material that is significantly harder than the materials being joined. For example, if the sheet 50 and post 55 are constructed from aluminum, the probe 105 may be constructed from tungsten carbide. Although the probe 105 is shown as a cylinder in the drawing, numerous different probe shapes may be used. U.S. Pat. No. 8,579,180 by Burford shows various probe shapes in FIGS. 1, 5*a*-*c*, 6*a*-*c*, 7, 9, 10, 11*a*, 12, 13, 16, 19-24 that are all herein incorporated by reference and may be incorporated in the probe 105.

The shoulder 110 of the FSW tool 60 is designed to frictionally heat the surface regions of the post 55, produce the downward forging action necessary for welding consolidation, and constrain the heated metal beneath the bottom of the shoulder 110. Although the shoulder 110 in the illustrated example is flat (parallel to the first inner surface 80) concave or convex curvatures may be incorporated into the shoulder. The shoulder 110 may be integrally formed with the probe 105, or it may be a separable component. Additionally, a bottom shoulder (not shown) may also be used in the welding process such that the shoulder 110 is pressed down against the first inner surface 80 of the post 55 while the bottom shoulder pressed up on the outer surface of the sheet 50. In that example, both the shoulder and the bottom shoulder are directly secured to the probe.

Figure 5:
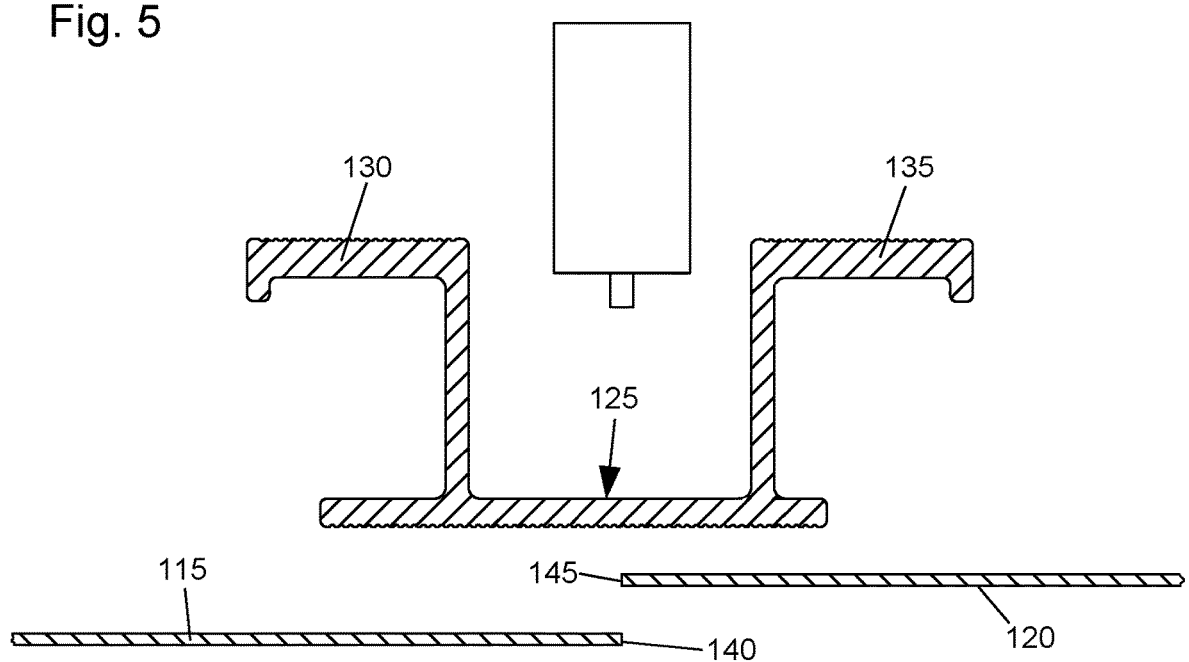
FIG. 5 is an elevational view of two sheets, a post, and an FSW stir head for joining the sheets and post together with a contiguous flat outer side.

FIG. 5 illustrates an example of a first sheet 115 and a second sheet 120 arranged to be secured together, and to a post 125 with first and second flanges (130, 135). The first sheet 115 is composed of a first material, the second sheet 120 is composed of a second material, and the post 125 is composed of a third material. The first, second, and third material may all be the same material, such as 1100 aluminum alloy, or each may be a unique composition. Alternatively, the post may be a first composition while the sheets are both constructed from the same material.

In the illustrated example, the first and second sheets (115, 120) are positioned adjacent to each other such that the end 140 of the first sheet 115 is adjacent to and abutting the end 145 of the second sheet 120. The post 125 is pressed down upon the first and second sheets (115, 120) and the FSW tool 60 is used to weld together the post 125 and the sheets (115, 120). In the illustrated example, the first and second sheets (115, 120) have the same thickness and are aligned such that the exterior surface of the resulting sidewall is smooth at the joint.

In the illustrated example shown in FIG. 5, the first and second flanges (130, 135) both extend to similarly shaped ribs and hooks. As with the structures of FIG. 4, these flanges, ribs, and hooks may be utilized to secure removable panels to the resulting sidewall. The first and second flanges (130, 135) may be positioned relative to each other at various positions on the base 55, however it is generally expected that they will be separated enough to allow FSW tool 60 to pass between the flanges. Alternatively, both flanges could be positioned such that the FSW tool 60 may access the base with both flanges on a single side of the FSW tool 60. For example, in the example shown in FIG. 5, both flanges could be moved to the far left of the base such that there is sufficient space for the FSW tool to access the base. While allowing the FSW tool to directly access the base is generally believed to be preferential, it is contemplated that the FSW tool could access the sidewall structure from underneath, so the positioning of the flanges is of less importance. That is, the FSW tool could be used to access the base via the sheet rather than accessing the sheets via the base as shown in FIGS. 4 and 5.

FIG. 6 shows first and second sheets (150, 155) positioned to be secured to a post 160 wherein the ends of the sheets (150, 155) are not aligned like they are in FIG. 5, and instead there is an overlap region 165. The use of an overlap region 165 increases the amount of material used in the weld, which may have an impact on the strength of the weld, but it also results in an exterior surface that is not smooth like the sidewall that results from the arrangement shown in FIG. 5. One additional benefit of using the overlap region instead of abutting sheets is that there are greater tolerances for slightly misaligned sheets so production of the sidewalls may be significantly easier through the use of an overlap region. The post 160 of FIG. 6 is shown with an outer surface 161 that is smooth and lacks texture. The rib 162 on the post 160 has an interior surface 163 that is also smooth and lacks texture.

In FSW, the FSW Tool 60 is spun at high speed and the probe 105 (or pin) is inserted into the post and sheets. As the FSW tool 60 is rotating, it moves forward along the welding interface. The friction of the stirring probe 105 interacting with the sheets and posts produces heat which makes at least a portion of the welding interface melt or soften. The melted materials mix flowing from front to back (and to some degree interior to exterior, and vice versa) under the influence of the stirring, and form into a compact solid phase weld seam under the extrusion of FSW tool 60. The construction after FSW is shown in FIGS. 7 through 9. The aluminum posts can be welded with the side wall outer panel one by one in a repeating manner.

FIGS. 7 through 9 show the resulting sidewalls from the welding arrangements shown in FIGS. 4 through 6, respectively. In these illustrations, the exterior sides of the posts abut the interior sides of the sheets. FIG. 8 uses the single flange version of the post shown in FIG. 5. The resulting sidewalls shown in FIGS. 7 and 8 are almost identical despite the structure of FIG. 7 being the result of a post welded to a sheet and the structure of FIG. 8 being the result of two sheets welded to a post. The near identical nature of the resulting products highlights the smoothness of the resulting sidewall. In each of the sidewall constructions shown in FIGS. 7 through 9, a weld region (170, 175, 180, respectively) secures the post to the sheet or sheets.

In FIGS. 7 and 8 the weld regions (170, 175) are the same thickness in that they both fully extend through the post and a single thickness of sheet. As shown in FIG. 7a, the area 173 of the sheet 50 that is directly exterior to the post is completely flat. As used herein, the term "directly exterior" is defined to refer to the portion of the sidewall exterior surface through which a perpendicular line would extend through the post. In other words, the whole area 173 is "directly exterior" to the post 55 despite only a portion of the "directly exterior" portion directly contacting the post. In FIG. 9, the weld region 180 is larger than the previous two figures' weld regions (170, 175) in that the weld region extends through the post 180 and two thicknesses of sheets (150, 155). The term "completely flat" is defined to mean a smooth flat surface without holes or bumps in the surface.

As seen in FIG. 7b, the weld regions include a plurality of mixed components that were originally in either the sheet 50 or the post 55. In the example shown in FIG. 7b, the first portions 172 of the weld were part of the sheet before the welding process while the second portions 174 of the weld were part of the post 55 before the welding process. As can be seen in the illustrated example, following the welding process, at least some of the first portions 172 (from the sheet) are now located more interior than the inner surface 70 of the sheet 50. Additionally, at least some of the second portions 174 (from the post) are now located more exterior than the outer surface 65 of the post. The size of the portions (172, 174) of FIG. 7b are not necessarily to scale relative to the sheets and posts, and in some examples the portions are micrometers in size.

In the sidewall construction shown in FIG. 9, there exists a slight gap 185 between the post 160 and the second sheet 155. The slight gap 185 is generally defined by the end of the first sheet 120, the interior side of the second sheet 155, and the interior side of the post. While the figure shows a gap, it is contemplated that various means could be used to eliminate the gap. For example, after using FSW technology to secure the post 160 to the sheets (150, 155) and adhesive or caulk could be used to fill the slight gap 185. Alternatively, a first region 190 of the exterior surface of the post 160 could be extended outward by approximately the thickness of the second sheet 155. The resulting post would have the first region 190 directly contact the first sheet 150 and an inwardly extending portion, or shoulder, adjacent to the first region 190 that abuts the end of the second sheet 155. The addition of a slight shoulder on the exterior surface of the post 160 may help facilitate construction or fabrication of the sidewall in that the shoulder could help simplify the alignment of the second sheet 155 and post 150. Additionally, the addition of the shoulder may facilitate the welding process by assisting in keeping the post 160 stationary relative to the second sheet 155.

In FIG. 9, the weld region 180 is shown as a single composition, however it is formed from mixed portions of the second sheet 155, the first sheet 120, and the post 55. During the welding process, components of the three pieces are mixed within the weld such that portions originally from the outermost second sheet 155 are now interiorly located adjacent to the post 55 while portions of the post 55 are now exteriorly located adjacent to the second sheet 155. Similarly, some portions of the first sheet 120 become interiorly located adjacent to the post during the welding process while other portions of the first sheet are more exterior than the exterior-most portion of the first sheet.

In FIGS. 7 through 9, the weld regions (170, 175, 180) are generally shown as circular however the weld region may also have other shapes, such as an hourglass region or one with jagged contours. The shape of the probe utilized, along with the speed at which the FSW tool rotates, and the speed at which the FSW tool travels along the workpiece all may impact the overall shape of the weld region.

FIGS. 10A and 10B show an example of a sidewall constructed from multiple sheets 195 welded together at posts 200 with FSW technology. The weld seams 205 shown have distinctive onion ring patterns that appear to have multiple circles overlapping along the length of the weld seam. The portions of the posts with the onion ring pattern are the first interior surfaces. In the illustrated example of FIGS. 10A and 10B, the weld seams 205 shown fully extend from the sidewall top 210 to the sidewall bottom 215 such that the welds are each approximately equal in length to the height of the overall sidewall. To "fully extend" from the top of the sidewall to the bottom of the sidewall is herein defined to mean a continuous weld seam from within 2 inches of the top of the sidewall to within 2 inches of the bottom of the sidewall.

FIGS. 11A and 11B show an alternative embodiment of a sidewall where a first set of weld seams 220 fully extend from the sidewall top 210 to the sidewall bottom 215 while a second set of weld seams 225 intermittently extend from the sidewall top 210 to the sidewall bottom 215. The use of intermittent weld seams is advantageous in some instances in that they may allow the sidewall to be constructed more quickly. In the example shown in FIGS. 11A and 11B, a single continuous sheet 230 may extend between the first set of weld seams 220 with additional posts 235 secured to the single continuous sheet 230 with intermittent second weld seams 225 to provide additional strength or rigidity to the resulting sidewall.

Between the posts with the first sets of weld seems 220, the sheet is continuously unperforated. The term "continuously unperforated" is herein defined to mean that the whole specified section is free from apertures through the section irrespective of whether the apertures are filled with a fastening structure such as a screw or a rivet. For example, if a screw passes through the sheet, then the sheet is not "continuously unperforated" even if the screw and sheet were to form a water-tight or airtight seal. A friction-stir-weld does not cause the sheet to become perforated unless a defect, such as a crack, occurs during the welding process. In the illustrated example shown in FIG. 18, the sheets 310 is continuously unperforated along the illustrated portion of the sidewall from within three inches of the top of the sheets 310 and from within three inches of the bottom of the sheets 310.

In the illustrated example, between the first sets of weld seems 220 there extends a weld-free horizontal section 221 of the single continuous sheet 230. The weld-free horizontal section 221 is horizontal but may deviate along the non-vertical axis perpendicular to the horizontal (i.e., along the axis that moves in and out of the container).

In addition to providing for potentially faster sidewall fabrication times, the use of intermittent weld seams allows for FSW technology to be used on sidewalls that are not completely flat. As an example, corrugated sheets of aluminum may be used in the sidewalls. In the corrugated sheet shown in FIG. 12, the sheet includes a flat area 240 that extends from a first side 245 of the sheet to an opposite second side 250. In the illustrated example, four corrugated areas 255 also extend between the first side 245 and the second side 250, but the corrugated areas 255 do not fully extend between the side such that on either side of the corrugated areas there are flat regions that fully extend from the sheet top 260 to the sheet bottom 265.

FIGS. 13A and 13B show examples of posts secured to the sheet of FIG. 12 using FSW technology. A first set of weld seams 220 fully extend from the top of the sidewall to the bottom of the sidewall while a second set of weld seams 225 intermittently extend from the top of the sidewall to the bottom. The weld seam 225 of FIG. 13A is formed from at least three distinct intermittent welds between the top and bottom of the sidewall. In the illustrated example of FIG. 13A, the two posts that are intermittently welded to the sheet are only welded to the flat areas 240 rather than the four corrugated areas 255 that extend between the first side 245 and the second side 250 that extend between the first side 245 of the sheet and the opposite second side 250.

FIGS. 10B, 11B, and 13B show top plan views of the structures of FIGS. 10A, 11B, and 13A, respectively. In the illustrated examples, the flanges and ribs that extend from the bases of the posts are all oriented in a similar direction. However, it should be appreciated that simply rotating the posts 180 degrees would change the orientation of the flanges and ribs. For example, alternating the orientation of every other post would allow for easy installation of panels between the posts. Alternatively, structures with attachment points could be secured between the posts to provide locations for tie-down straps to be secured to the sidewall.

In the construction of trailer sidewalls, aluminum sheets are commonly supplied as either milled aluminum or pre-painted aluminum. When unpainted milled aluminum is used in the construction of sidewall via FSW technology there is no need for additional processing of the weld seam. If painted aluminum is utilized, the paint adjacent to the weld area will fleck off, so additional processing may be done to refine the appearance of the side wall. As shown in FIG. 14, one way to address the paint issue is to repaint the area that is affected by the FSW process. Another alternative is shown in FIG. 15 where an adhesive tape 270 is secured over the weld area to improve the appearance.

Figure 17:
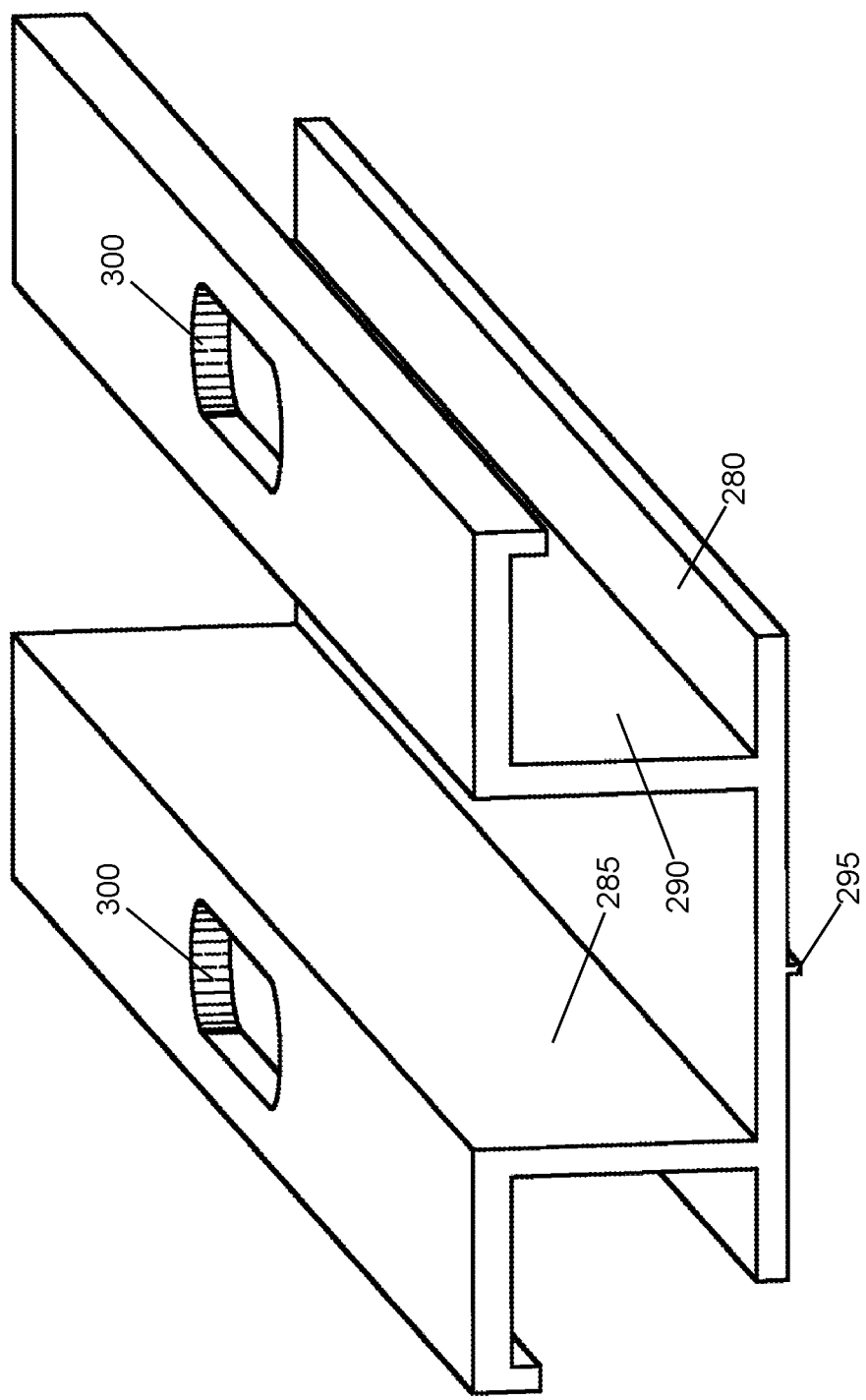
FIG. 17 is a perspective view of a post having dual flanges and ribs with logistics slots in the ribs.

FIGS. 16 and 17 illustrate an example of a post 275 adapted to be secured to two sheets (not shown). As with the post shown in FIG. 5, the post 275 includes a base 280 with first and second flanges (285, 290) inwardly extending from the base 280. Each of the flanges (285, 290) also include ribs and hooks that allow the post 275 to receive removeable panels. The post 275 also includes a small lip 295 outwardly extending from the base 280. The lip 295 extends for the width of a sheet (not shown) and provides two flat sides upon which the sheet may be pressed during the FSW process. By inclusion of the lip 295, alignment of the post and sheets is simplified, and the welding process may be expedited. In the ribs that extend from the flanges (285, 290) are logistic slots 300 that are adapted to receive tie downs and other features for securing cargo within the container. Although the logistic slots illustrated are of oval shape, other shapes may be used. FIGS. 45 through 50, and their corresponding descriptions, of U.S. Pat. No. 8,016,152, herein incorporated by reference, illustrate several different other shapes that may be used in the logistic slots of the post.

Figure 18:
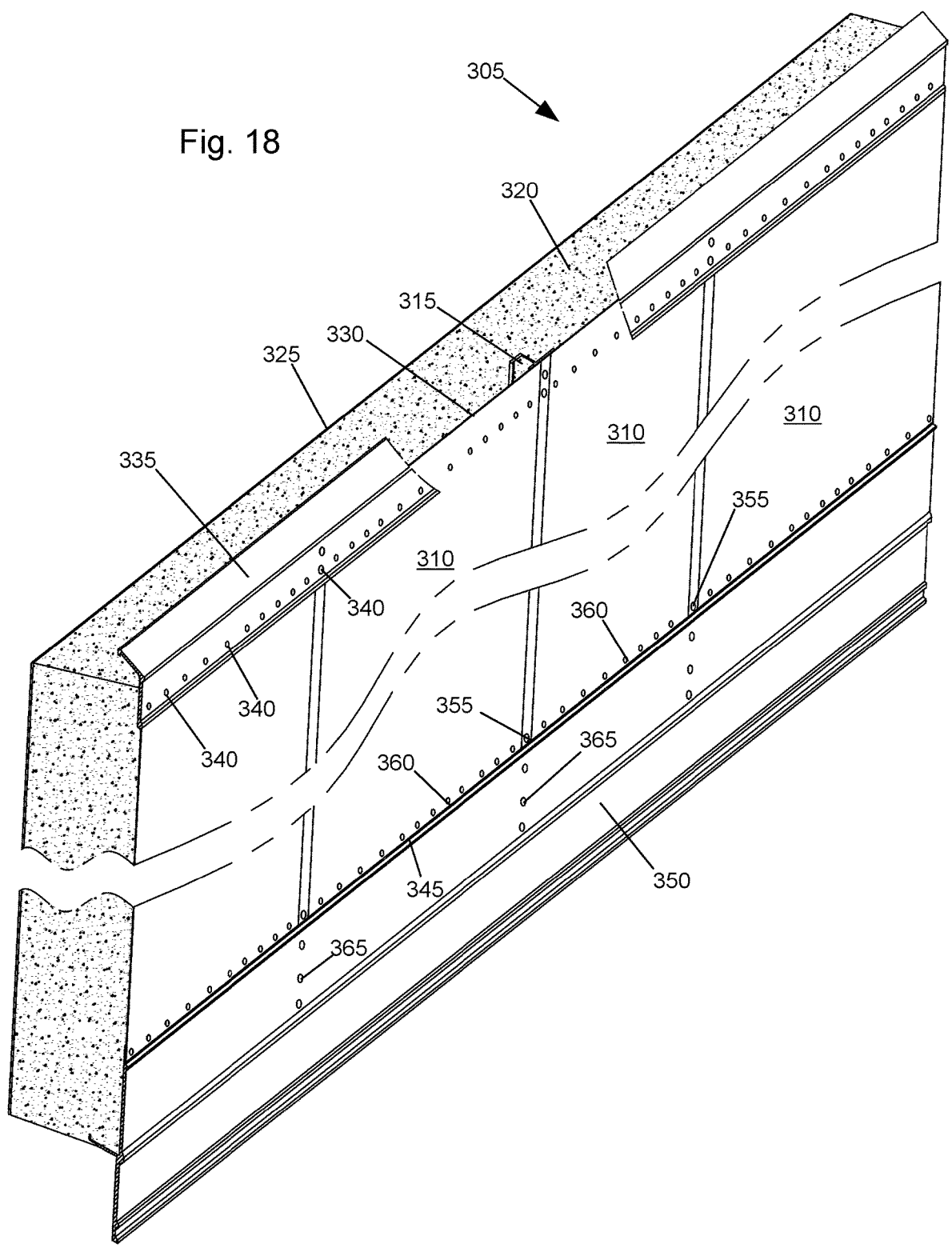
FIG. 18 is a perspective view of an insulated sidewall constructions.

FIG. 18 shows an illustration of an insulated sidewall construction 305 constructed from a plurality of sheets 310 secured to posts 315 through FSW technology. A thickness of insulative foam 320 is located between the sheets 310 and an inner lining 325 of the sidewall. Secured to the top 330 of the sheets 310 is a top rail 335 that provides structural integrity for the sidewall 305. While the top rail 335 will preferably extend the full length of the sidewall, in the illustrated example, a portion of the top rail has been omitted to reveal the underlying structure of the post 315. In the illustrated example, rivets 340 are used to secure the top rail 335 to the sheets 310 and posts 315, however the inventors contemplate that FSW welding may be utilized in some embodiments. At the bottom 345 of the sheets 310 is a base rail 350 that is secured to the sheets 310 and posts 315 through three sets of rivets. The first rivet set 355 is secured to the base rail 350, a sheet 310 and a post 315. The second rivet set 360 is secured to the sheets 310 and the base rail 350, but not the post 315. The third rivet 365 is secured to the base rail 350 and the posts 315, but not the sheets 310. As with the top rail 335, the inventors contemplate FSW technology may also be used in place of the rivets (355, 360, 365) secured to the base rail 350.

The sidewalls disclosed have several advantages over traditional riveting and adhesive constructions. For example, with FSW there are no consumable products such as rivets or glue thus simplifying the construction process. FSW welds have been shown to have a higher connection strength than traditional bonding methods such as riveting and adhesives. As shown in FIGS. 7 through 9, the weld seams of the sheet(s) and post are compact and provide a smooth aerodynamic exterior surface for the sidewall directly exterior to the post. As can be seen in FIGS. 10 through 12, every post is welded to the sheet such that structure becomes a single piece with improved overall strength and rigidity.

Another advantage of the disclosed structures/methods is the sidewall has less residual stress, less deformation, better flatness, and a refined appearance as there are no protrusions on the exterior side of the side wall so it is easier for decals or logos to be placed on the side wall. The use of FSW technology also provides excellent sealing properties between the sheets and also between the sheets and the posts. Although adhesives or tape may be added to alter the appearance of the sidewall, they are not required to seal the sidewall from air or moisture infiltration. Finally, FSW technology is energy efficient in that the process can be highly mechanized and automated.

The inventors contemplate several alterations and improvements to the disclosed invention. Other alterations, variations, and combinations are possible that fall within the scope of the present invention. Although the preferred embodiment of the present invention has been described, those skilled in the art will recognize other modifications that may be made that would nonetheless fall within the scope of the present invention.

We claim:

1. A sheet-and-post wall construction comprising:
    a first sheet composed of a first material, the first sheet having an interior side and an exterior side;
    a first post composed of a second material, the first post having an exterior side abutting the interior side of the first sheet;
    a first friction-stir-weld joint extending through the exterior side of the first post and the interior side of the first sheet, the first friction-stir-weld joint including
      first material from the first sheet more interiorly located than the interior side of the first sheet,
      second material from the first post more exteriorly located than the exterior side of the first post;
    a second post composed of a second material, the second post having an exterior side abutting the interior side of the first sheet;
    a second friction-stir-weld joint extending through the exterior side of the second post and the interior side of the first sheet, the second friction-stir-weld joint including
      first material from the first sheet more interiorly located than the interior side of the first sheet,
      third material from the second post more exteriorly located than the exterior side of the second post;
    a third post composed of a third material, the third post having an exterior side abutting the interior side of the first sheet;
    a third friction-stir-weld joint extending through the exterior side of the third post and the interior side of the first sheet, the third friction-stir-weld joint including
      first material from the first sheet more interiorly located than the interior side of the first sheet,
      third material from the third post more exteriorly located than the exterior side of the third post;
    wherein
    the second post is located between the first post and the third post;
    the first and third friction-stir-weld joints fully extends from the top of the first sheet to the bottom of the first sheet; and
    the second friction-stir-weld joint intermittently extends from the top of the first sheet to the bottom of the first sheet.

2. The sheet-and-post wall construction of claim 1 wherein
    the first sheet includes a first corrugated portion between a first un-corrugated portion and a second un-corrugated portion;
    the first post friction-stir-welded to the first un-corrugated portion of the first sidewall,
    the third post friction-stir-welded to the second un-corrugated portion of the first sidewall, and
    the second friction-stir-weld joint includes at least three distinct intermittent welds of the second post to the first corrugated portion of the first sidewall.

3. The sheet-and-post wall construction of claim 2 wherein
    the first sheet is continuously unperforated in an area between the first and third posts and
    between within three inches of top of the first sheet and three inches of the bottom of the first sheet.

4. The sheet-and-post wall construction of claim 2 wherein
    a weld-free horizontal section of the first sheet fully extends from the first friction-stir-weld joint to the third friction-stir-weld joint.

5. The sheet-and-post wall construction of claim 2 wherein
    the first post has a first interior side surface extending parallel to the exterior side of the first post,
    the first friction-stir weld joint extending through
      the first interior surface of the first post,
      the exterior side of the first post, and
      the interior side of the first sheet.

6. The sheet-and-post wall construction of claim 5 further comprising
    the first post includes a second interior surface extending parallel to the exterior side of the first post;
    the first post including a flange inwardly extending from adjacent to the first interior surface of the first post, the flange located between the first and second interior surfaces of the first post; and
    a rib extending away from and parallel to the interior surface of the first post, the rib extending from the interior-most end of the flange, and the rib located distant from the second interior surface of the first post.

7. The sheet-and-post wall construction of claim 6 wherein
    a plurality of logistics slots extend through the rib.

8. The sheet-and-post wall construction of claim 1 wherein
    the first, second, and third posts each include an interior side, extending parallel to their respective exterior sides, having an onion ring pattern.

* * * * *